US009075572B2

(12) United States Patent
Ayoub et al.

(10) Patent No.: US 9,075,572 B2
(45) Date of Patent: Jul. 7, 2015

(54) MEDIA ENHANCEMENT DOCK

(75) Inventors: Ramy S Ayoub, Arlington Heights, IL (US); Daniel F Tell, Lake Forest, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 502 days.

(21) Appl. No.: 13/462,135

(22) Filed: May 2, 2012

(65) Prior Publication Data

US 2013/0293670 A1  Nov. 7, 2013

(51) Int. Cl.
H04N 13/02 (2006.01)
G06F 1/16 (2006.01)
H04N 7/14 (2006.01)
H04M 3/56 (2006.01)

(52) U.S. Cl.
CPC .............. *G06F 1/1632* (2013.01); *H04M 3/567* (2013.01); *H04N 7/142* (2013.01)

(58) Field of Classification Search
CPC ............... G06F 1/1632; H04N 5/2252; H04N 13/0429; G03B 17/563; G03B 17/566; G03B 17/56; G03B 17/38
USPC ...................................................... 348/42–55
See application file for complete search history.

(56) References Cited

U.S. PATENT DOCUMENTS

| 8,388,243 | B1* | 3/2013 | Smith ........................... 396/422 |
| 8,738,080 | B2* | 5/2014 | Nhiayi ........................... 455/557 |
| 2002/0009137 | A1* | 1/2002 | Nelson et al. .............. 375/240.1 |
| 2008/0305829 | A1* | 12/2008 | Monroe ...................... 455/556.1 |
| 2009/0235006 | A1* | 9/2009 | Desrosiers et al. ........... 710/304 |
| 2009/0244917 | A1 | 10/2009 | Davie et al. |
| 2011/0193934 | A1 | 8/2011 | Roberts et al. |
| 2011/0232989 | A1 | 9/2011 | Lee et al. |
| 2012/0026298 | A1* | 2/2012 | Filo et al. ........................ 348/49 |
| 2012/0083314 | A1* | 4/2012 | Ng et al. ....................... 455/557 |
| 2012/0270600 | A1* | 10/2012 | Zelson ....................... 455/556.1 |

OTHER PUBLICATIONS

Charlie Sorrel, hands on with zoom fisheye wide and macro lenses, Apr. 6, 2012.*
Michael Zhang, apple-icam-a-modular-concept-camera-that-uses-an-iphone-for-brains, Nov. 28, 2011.*
Louis Trapani: "Giving Your iPhone (or Any Mobile Phone) Some Zoom", Jan. 12, 2011, retrieved from the Internet: URL:http://arttrap.com/node/506 [retrieved on Jul. 24, 2013], all pages.
Patent Cooperation Treaty, International Search Report and Written Opinion of the International Searching Authority for International Application No. PCT/US2013/039171, Dec. 20, 2013, 17 pages.

* cited by examiner

*Primary Examiner* — Sath V Perungavoor
*Assistant Examiner* — Nathnael Aynalem

(57) ABSTRACT

Systems and methods are provided for enhancing the video and audio capabilities of an electronic device (102) using a media enhancement dock (150, 250). According to certain aspects, the systems and methods enhance a field of view of a camera (116) with one or more optical lenses (152, 252, 254). Three dimensional images may be captured and constructed based on images from multiple optical lenses and a shutter (256). The dock may also enhance the sound captured by providing one or more far-field microphones (154, 262, 264). A beamforming analysis of the audio signals from multiple microphones may increase the sensitivity and localization of sound. Internal and/or external light sources may be adjusted by the dock to achieve a sufficient level of ambient light in the environment. Videoconferencing and gesture control applications executing on the electronic device may be enriched through use of the media enhancement dock.

21 Claims, 10 Drawing Sheets

MEDIA ENHANCEMENT DOCK

FIELD

This application generally relates to a media enhancement dock that interfaces with an electronic device. In particular, the application relates to the use of a media enhancement dock for enhancing the video and audio capabilities of the electronic device.

BACKGROUND

Portable electronic devices, such as smartphones, cellular phones, and personal digital assistants, may have components including a camera for capturing images and video and/or a microphone for capturing audio. The camera and microphone may be used in conjunction with various applications executing on the electronic device, such as videoconferencing applications. The components may typically be designed for capturing images, video, and audio of users and subjects that are physically near the electronic device and/or in regular lighting conditions. Such electronic devices may be mobile and can be relatively inexpensive.

Consumer electronics devices, such as set-top boxes, gaming systems, and dedicated videoconferencing devices, may also include a camera and/or a microphone. These types of electronic devices may typically be relatively expensive due to their higher-end components that capture images, video, and audio of users and subjects that are physically farther from the electronic device and/or in low lighting conditions. Moreover, consumer electronics devices are typically not moved after installation because they are often connected to other devices, such as a television or other display, and also plugged into an electrical outlet. Some users may have privacy concerns with consumer electronics devices due to the camera and/or microphone that are permanently present in the users' living room or family room.

Accordingly, there is an opportunity for an apparatus that addresses these capability, cost, and privacy concerns. More particularly, there is an opportunity for an apparatus that enhances the video and audio capabilities of electronic devices.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

DETAILED DESCRIPTION

Systems and methods are disclosed for a media enhancement dock with components that augment and enhance the video and audio capabilities of an electronic device. The dock components may include one or more optical lenses to supplement a camera of the electronic device, one or more far-field microphones to capture audio, and/or a data input interface to receive a data signal from the electronic device. The dock and the electronic device may work in combination to enable enhanced videoconferencing and gesture control capabilities. According to one embodiment, the media enhancement dock includes a housing for interfacing with an electronic device that has a camera and an audio input interface, an optical lens for enhancing a field of view of the camera, and a far-field microphone for sensing and converting sound into an audio signal that is communicated to the audio input interface. According to another embodiment, the media enhancement dock includes a housing for interfacing with an electronic device that has a camera and a data output interface, an optical lens for enhancing a field of view of the camera, and a data input interface for receiving a data signal from the data output interface.

The systems and methods as discussed herein can offer improvements to existing technologies. In particular, the media enhancement dock may include multiple optical lenses and a shutter to allow lens images from each of the optical lenses to be presented to the camera of the electronic device. The electronic device or the dock may capture three dimensional images based on the multiple lens images. User gestures in the three dimensional images may be recognized and interpreted by the dock or the electronic device into control commands for the dock, the electronic device, and/or another consumer electronics device. The dock may also include multiple microphones and a processor to produce a beamformed audio signal based on the audio signals from the multiple microphones. A lighting controller may also be included in the dock to control a level of illumination of a light source, based on a detected ambient lighting level. It should be appreciated that other benefits and efficiencies are envisioned.

Figure 1:
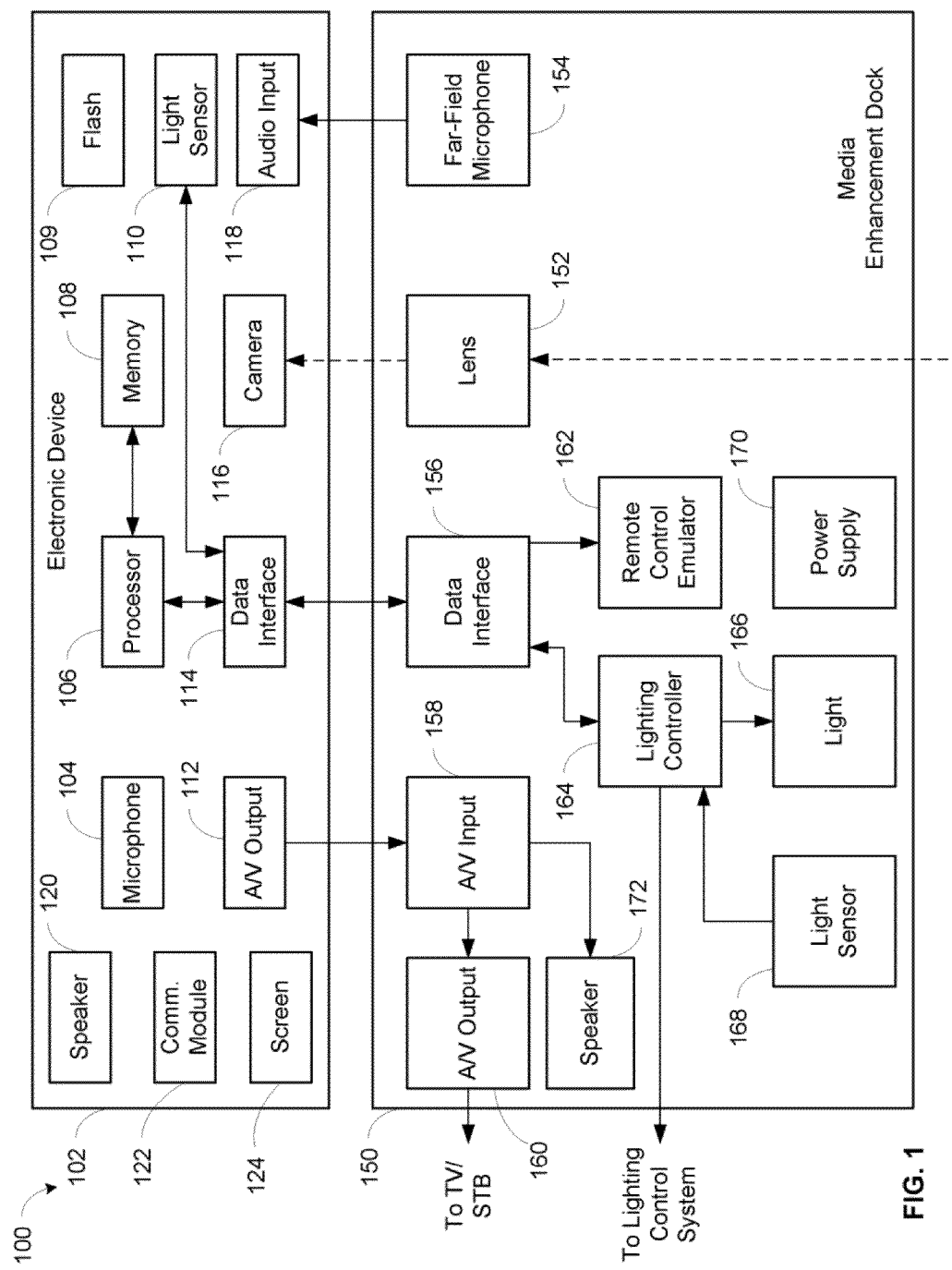
FIG. 1 is a block diagram of a media enhancement dock in accordance with some embodiments.

FIG. 1 illustrates an example of a system 100 in which the embodiments may be implemented. The system 100 may include an electronic device 102 and a media enhancement dock 150. The electronic device 102 may be portable and may be, for example, a smartphone, a cellular phone, a personal digital assistant, a tablet computer, or the like, and may physically and/or electronically interface with the media enhancement dock 150. The system 100 may take advantage of the processing capabilities of the electronic device 102 to enhance the usage of applications such as videoconferencing or gesture control. Videoconferencing applications may include, for example, Google+ Hangouts, Skype, ooVoo, Google Talk, FaceTime, and other applications.

The electronic device 102 may include a microphone 104, a processor 106, a memory 108 (e.g., flash memory, memory card, hard drive, solid state drive, etc.), a flash 109, a light sensor 110, an audio/video output 112 (e.g., HDMI, Mini-HDMI, FireWire, proprietary interfaces, etc.), a data interface 114 (e.g., Universal Serial Bus (USB), Mini-USB, Micro-USB, FireWire, proprietary interfaces, etc.), one or more cameras 116, an audio input interface 118 (e.g., 3.5 mm input, USB, Mini-USB, Micro-USB, proprietary interfaces, etc.), and a speaker 120. The audio/video output 112, data interface 114, and/or audio input interface 118 may be combined or separate. The microphone 104 and the speaker 120 can be piezoelectric components.

The software in the memory 108 may include one or more separate programs or applications. The programs may have ordered listings of executable instructions for implementing logical functions. The software may include a suitable operating system of the electronic device 102, such as Android from Google, Inc., iOS from Apple, Inc., BlackBerry OS from Research in Motion Limited, Windows Phone from Microsoft Corporation, or Symbian from Nokia Corporation. The operating system essentially controls the execution of other computer programs, and provides scheduling, input-output control, file and data management, memory management, and communication control and related services.

The electronic device 102 may further include a communication module 122 that includes one or more transceivers for receiving and transmitting data over a wireless and/or wired connection. The transceivers may function in accordance with the IEEE 802.11 standard or other standards. More particularly, the communication module 122 may include one or more WWAN transceivers configured to communicate with a wide area network including one or more cell sites or base stations to communicatively connect the electronic device 102 to additional devices or components. Further, the communication module 122 can include one or more WLAN and/or WPAN transceivers configured to connect the electronic device 102 to local area networks and/or personal area networks, such as a Bluetooth network.

The electronic device 102 may also include a display screen 124 and additional I/O components (not shown), such as keys, buttons, lights, LEDs, cursor control devices, haptic devices, etc. The display screen 124 and the additional I/O components may be considered to form portions of a user interface (e.g., portions of the electronic device 102 associated with presenting information to the user and/or receiving inputs from the user). In some embodiments, the display screen 124 is a touchscreen display composed of singular or combinations of display technologies such as electrophoretic displays, electronic paper, polyLED displays, OLED displays, AMOLED displays, liquid crystal displays, electrowetting displays, rotating ball displays, segmented displays, direct drive displays, passive-matrix displays, active-matrix displays, lenticular barriers, and/or others. Further, the display screen 124 can include a thin, transparent touch sensor component superimposed upon a display section that is viewable by a user. For example, such displays include capacitive touch screens, resistive touch screens, surface acoustic wave (SAW) touch screens, optical imaging touch screens, and the like.

The media enhancement dock 150 in the system 100 may physically and/or electronically interface with the electronic device 102. An optical lens 152 in the dock 150 may produce a lens image and be configured to enhance a field of view of the camera 116 of the electronic device 102. In particular, the optical lens 152 may allow far-field images to be captured by the camera 116, such as in a family room or living room environment where subjects may be located farther away from the electronic device 102 and the dock 150. For example, the optical lens 152 may allow images including objects that are over ten feet away from the optical lens 152 and the dock 150 to be captured by the camera 116. In some embodiments, the optical lens 152 may be physically overlaid on the camera 116 such that the lens image produced by the optical lens 152 is presented directly to the camera 116. In other embodiments, the lens image produced by the optical lens 152 may be presented to the camera 116 indirectly, such as through an optical waveguide, e.g., optical fiber. Regardless of how the lens image is presented to the camera 116, the overall result of providing an optical lens 152 in addition to the existing lens of the camera 116 of the electronic device 102 is that a clearer and more distinct image will be created. The clearer and more distinct image can be used by an application, such as for videoconferencing and gesture control, that is executing on the electronic device 102.

The optical lens 152 may include a wide angle lens, a fisheye lens, a high power zoom lens, and/or another type of lens. If multiple types of optical lenses are included on the dock 150, each type of optical lens 152 may be interchangeable with one another so that the lens image of the desired type of optical lens is presented to the camera 116. If the optical lens 152 is a high power zoom lens, a zoom command may control the zoom level of the high power zoom lens. The zoom command may be received from the electronic device 102 or the dock 150. For example, a user may control the zoom lens through an application executing on the electronic device 102. As another example, the user may control the zoom lens using a remote control for the dock 150. In this case, the dock 150 may include a remote control receiver (not shown), such as an infrared receiver and a processor (not shown) to process the zoom commands from the remote control. In some embodiments, the data interface 156 may include a controller or field-programmable gate array (FPGA) that can process the zoom commands from the remote control and/or interpret commands from the electronic device 102. The commands from the electronic device 102 may include commands for controlling lighting and to transmit commands to a remote control emulator 162, as described further below.

A far-field microphone 154 may sense and convert sound into an audio signal. The microphone 154 may be optimized to capture sound that originates from farther away from the electronic device 102 and the dock 150, such as in a family room or living room environment. For example, the microphone 154 may have characteristics, such as gain and sensitivity, to clearly detect sound sourced from over ten feet away from the microphone 154 and the dock 150. The audio signal may be transmitted to the audio input interface 118 of the electronic device 102. The microphone 154 may be a condenser microphone, electret microphone, dynamic microphone, ribbon microphone, carbon microphone, piezoelectric microphone, fiber optic microphone, or other type of microphone. The directionality of the microphone 154 may determine its sensitivity to sound, and can be omnidirectional, unidirectional, cardioid, supercardioid, shotgun, or other directionalities. An amplifier may also be included in the microphone 154 to increase the audio sensitivity.

A data interface 156, such as USB, Micro-USB, FireWire, proprietary interfaces, etc., may allow data to be received from and transmitted to the data interface 114 of the electronic device 102. Such data may include user input, sensor data, commands, and other types of data. The data interface 156 may be in communication with a remote control emulator 162. The remote control emulator 162 may receive a command, such as from the processor 106 in the electronic device 102, which specifies a particular function on a consumer electronics device (not shown), such as a television set, a digital video recorder (DVR), a cable set top box, and the like. Such functions may include power, volume up/down, channel up/down, channel numbers, and the like. The remote control emulator 162 may include an infrared blaster device, for example, that is in communication with a consumer electronics device (not shown).

The images captured by the camera 116 may be rendered for local or remote viewing in the case of videoconferencing, such as to the screen 124 or from an audio/video output 160 to an external display. The images may also be used for gesture control purposes. Gesture control includes the recognition and interpretation of bodily movements made by a user for interacting with the electronic device 102, the dock 150, and/or another device, such as a television, DVR, or set-top box. For example, a user may gesture with their hands and/or arms to control a television to change channels, change volume, or other functions. The processor 106 may recognize and interpret such gestures in the images and transmit the corresponding command through the data interfaces 114 and 156 to the remote control emulator 162. As another example, a user may perform a gesture to answer an incoming phone call, dial a phone number, enable voice recognition, start an application, or perform other functions of the electronic device 102. In this case, the processor 106 may recognize and interpret such gestures in the images and execute the desired function.

The data interface 156 may also be in communication with a lighting controller 164. The lighting controller 164 may control the level of illumination of a light source, such as a light 166 on the dock 150, the flash 109 on the electronic device 102, and/or a light source external to the dock 150 and the electronic device 102 that is controlled by a lighting control system. These light sources may include one or more lighting elements, such as light emitting diodes, incandescent lights, fluorescent lights, halogen lights, high intensity lights, etc. A light source external to the dock 150 and the electronic device 102 may include household lamps, ceiling fixtures, recessed lighting, track lighting, and other types of lighting. A lighting control system, such as those following the ZigBee, Z-Wave, X10, or similar protocols, may be in wired or wireless communication with the lighting controller 164. The lighting controller 164 may therefore communicate adjustments to the level of illumination of these external light sources through the lighting control system.

The level of illumination may be adjusted so that the environment is sufficiently lit such that the camera 116 can adequately capture images farther away from the electronic device 102 and the dock 150. A level of ambient light in the environment may determine the level of illumination of the light source. The level of illumination of the light source may be increased or decreased, depending on the detected level of ambient light. The level of ambient light may be detected by a light sensor 168 of the dock 150, a light sensor 110 of the electronic device 102, a light sensor in a lighting control system, and/or other sensor. These sensors may include a photocell, photoresistor, and the like. The level of ambient lighting detected by the light sensor 110 may be received by the lighting controller 164 through the data interface 156. A light source may not be turned on if the detected level of ambient light is already sufficient. In one embodiment, a light source may automatically be turned on upon connection of the electronic device 102 and the dock 150.

An audio/video input 158 may be in communication with the audio/video output 112 of the electronic device 102. The audio/video input 158 may include HDMI, Mini-HDMI, FireWire, proprietary interfaces, etc. An audio/video signal may be received from the audio/video output 112 at the audio/video input 158 and then transmitted or passed to an audio/video output 160. The audio/video output 160 may be in wired or wireless communication with a television, DVR, set-top box, or other device to present the video and audio as in the audio/video signal. The audio/video output 160 may include a USB connection, HDMI, Mini-HDMI, FireWire, Wi-Fi, or other connection. The audio/video signal may include audio and video that are captured by the microphone 104 and camera 116 of the electronic device 102. The audio/video signal may also include audio and video received via the communication module 122 of the electronic device 102. In one embodiment, the speaker 120 and the screen 124 of the electronic device 102 may display and present the same or different audio and video as in the audio/video signal. In another embodiment, a speaker 172 of the dock 150 may receive the audio from the audio/video input 158 to replace or supplement the audio that is transmitted from the audio/video output 160.

A power supply 170 may be included in the dock 150 for receiving and distributing electrical power to components in the dock 150. The electronic device 102 may also be powered by a connection to the power supply 170, and/or a battery (not shown) of the electronic device 102 may be charged by the power supply 170. The power supply 170 may include electrical components to adjust the voltage and current to the appropriate levels for the components in the dock 150, the electronic device 102, and/or the battery of the electronic device 102.

Figure 2:
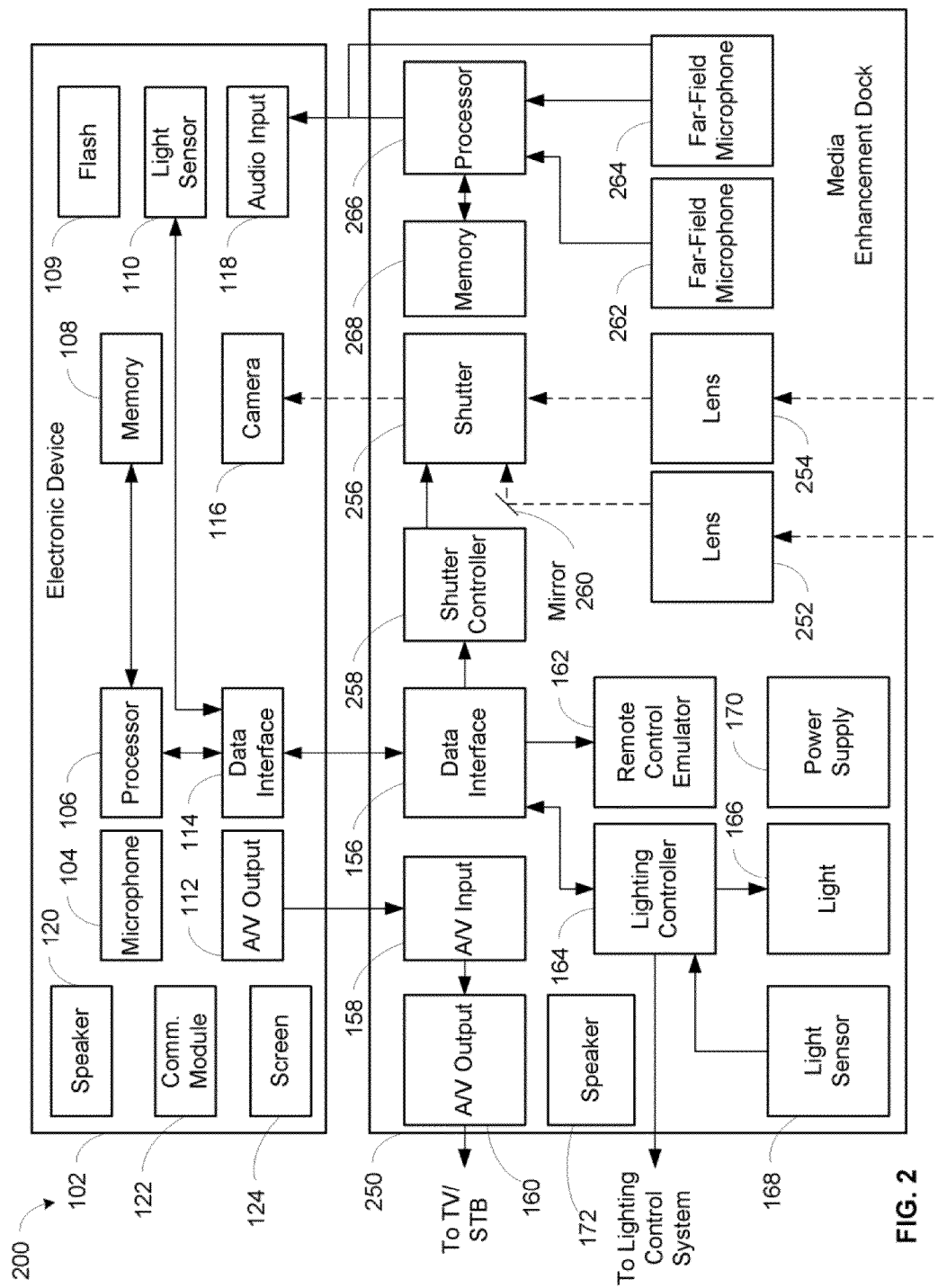
FIG. 2 is a block diagram of another media enhancement dock in accordance with some embodiments.

FIG. 2 illustrates an example of a system 200 in which the embodiments may be implemented. The system 200 may include an electronic device 102 and a media enhancement dock 250. As in the system 100, the electronic device 102 may be portable and may physically and/or electronically interface with the media enhancement dock 250. The electronic device 102 and its components are described above with reference to FIG. 1. Some components of the dock 250, including the data interface 156, remote control emulator 162, lighting controller 164, light 166, light sensor 168, audio/video input 158, audio/video output 160, power supply 170, and speaker 172 are also described above with reference to FIG. 1. The system 200 may take advantage of the processing capabilities of the electronic device 102 to enhance the usage of applications such as videoconferencing or gesture control.

The media enhancement dock 250 may include multiple optical lenses 252, 254 that each produce a respective lens image. The optical lenses 252, 254 may be configured to enhance a field of view of the camera 116 to allow far-field images to be captured, such as in a family room or living room environment where subjects may be located farther away from the electronic device 102 and the dock 250. For example, the optical lenses 252, 254 may allow images including objects that are over ten feet away from the optical lenses 252, 254 and the dock 250 to be captured by the camera 116. In some embodiments, the lens images produced by the optical lenses 252, 254 may be presented to the camera 116 directly such that the optical lenses 252, 254 are physically overlaid on the camera 116. In other embodiments, the lens images produced by the optical lenses 252, 254 may be presented to the camera 116 indirectly, such as through an optical waveguide, e.g., optical fiber. Regardless of how the lens image is presented to the camera 116, the overall result of providing optical lenses 252, 254 in addition to the existing lens of the camera 116 of the electronic device 102 is that clearer and more distinct images will be created. The clearer and more distinct images can be used by an application, such as for videoconferencing and gesture control, that is executing on the electronic device 102.

The optical lenses 252, 254 may include wide angle lenses, fisheye lenses, high power zoom lenses, and/or other type of lenses. If multiple types of optical lenses are included on the dock, each type of the optical lenses 252, 254 may be interchangeable with one another so that the lens image of the desired type of optical lens is presented to the camera 116. If the optical lenses 252, 254 are high power zoom lenses, a zoom command may control the zoom level of the high power zoom lenses. The zoom command may be received from the electronic device 102 or the dock 250. For example, a user may control the zoom lens through an application executing on the electronic device 102. As another example, the user may control the zoom lens using a remote control for the dock 250. In this case, the dock 250 may include a remote control receiver (not shown), such as an infrared receiver and the processor 266 may process the zoom commands from the remote control. In some embodiments, the data interface 156 may include a controller or field-programmable gate array (FPGA) that can process the zoom commands from the remote control and/or interpret commands from the electronic device 102. The commands from the electronic device 102 may include commands for controlling lighting and to transmit commands to a remote control emulator 162, as described above.

The use of multiple optical lenses 252, 254 and a shutter 256 may allow the capturing and construction of three dimensional images. Three dimensional images may be captured and constructed for local or remote viewing of parties, as in the case of videoconferencing, and/or for gesture control purposes. In particular, the shutter 256 may alternately present a lens image from the optical lens 252 and a lens image from the optical lens 254 to the camera 116. The lens image from the optical lens 252 may be reflected to the shutter 256 by a mirror 260 or an optical waveguide. The lens images may be alternately presented to the camera 116 by changing a position of the shutter 256 based on a frame synchronization signal received from the electronic device 102. A shutter controller 258 may use the frame synchronization signal so that the position of the shutter 256 allows the lens images from the optical lenses 252, 254 to be presented to the camera 116 with the appropriate timing based on the frame rate of the camera 116. The frame synchronization signal may be received by the shutter controller 258 through the data interface 156. The alternating lens images may be used by a processor, such as the processor 106 and/or the processor 266, to construct three dimensional video frames.

Gesture control includes the recognition and interpretation of bodily movements made by a user for interacting with the electronic device 102, the dock 250, and/or another device, such as a television, DVR, or set-top box. In the case of three dimensional images, the appearance and depth of a gesture may be recognized and interpreted, which can expand the types and numbers of possible gestures. The processor 106 of the electronic device 102 and/or the processor 266 of the dock 250 may perform the gesture recognition and interpretation. If the processor 106 of the electronic device 102 performs the gesture recognition and interpretation, the three dimensional images may be analyzed and constructed by the processor 106 based on the lens images presented to the camera 116. The processor 106 may recognize and interpret gestures in the three dimensional images and transmit the corresponding command through the data interfaces 114 and 156 to the remote control emulator 162. If the gesture is interpreted to be a command for the electronic device 102, then the processor 106 may executed the desired function corresponding to the command.

In the case where the processor 266 of the dock 250 performs the gesture recognition and interpretation, the three dimensional images may be analyzed and constructed by the processor 266 based on the lens images captured by the optical lenses 252, 254. The processor 266 may recognize and interpret gestures in the three dimensional images and transmit the corresponding command to the remote control emulator 162. In one embodiment, the processor 266 of the dock 250 may receive three dimensional images from the processor 106, such as through the data interfaces 114 and 156, so that the processor 266 may recognize and interpret gestures in the three dimensional images. The corresponding command may then be transmitted from the processor 266 to the remote control emulator 162. In this embodiment, the processor 106 of the electronic device 102 may analyze and construct the three dimensional images based on the lens images captured by the optical lenses 252, 254.

Figure 5:
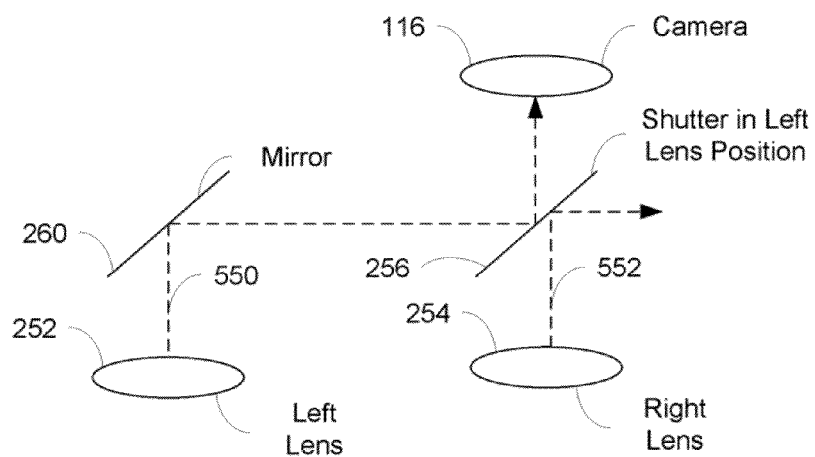
FIG. 5 illustrates an example configuration of a multiple lens system of a media enhancement dock in accordance with some embodiments.
Figure 6:
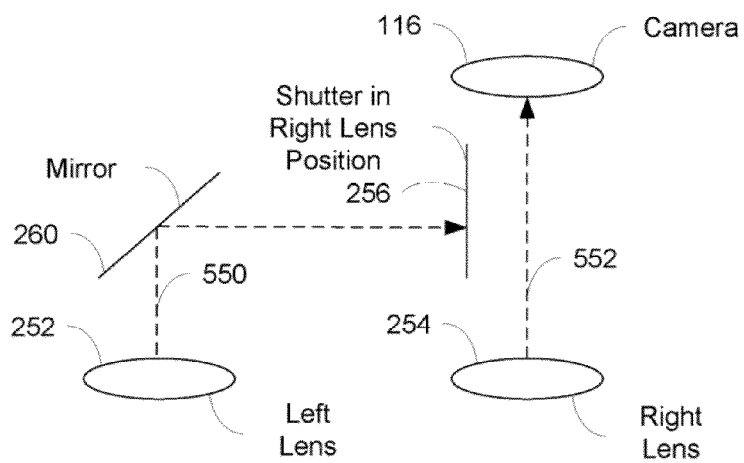
FIG. 6 illustrates another example configuration of a multiple lens system of a media enhancement dock in accordance with some embodiments.

The usage of the multiple optical lenses 252, 254 is further detailed with reference to FIGS. 5 and 6 that illustrate examples of multiple lens systems of media enhancement docks. In FIG. 5, the shutter 256 is in a left lens position so that a lens image 550 produced by the optical lens 252 is presented to the camera 116. The lens image 550 may be reflected by a mirror 260 and by the shutter 256 before reaching the camera 116. The lens image 552 produced by the optical lens 254 is blocked by the shutter 256 from reaching the camera 116 in FIG. 5. As shown in FIG. 6, the shutter 256 is in a right lens position so that the lens image 552 produced by the optical lens 254 is presented directly to the camera 116. In this case, the lens image 552 is not reflected to reach the camera 116. The lens image 550 produced by the optical lens 252 is blocked by the shutter 256 from reaching the camera 116 in FIG. 6.

Figure 7:
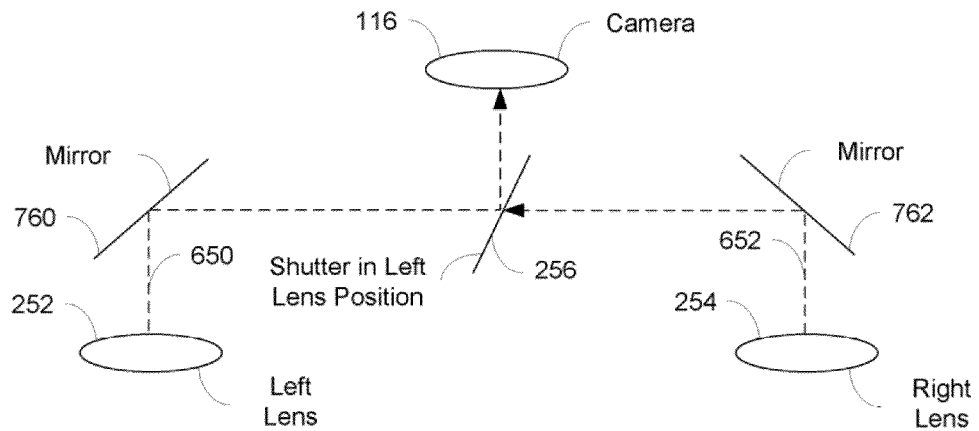
FIG. 7 illustrates an example configuration of an offset multiple lens system of a media enhancement dock in accordance with some embodiments.
Figure 8:
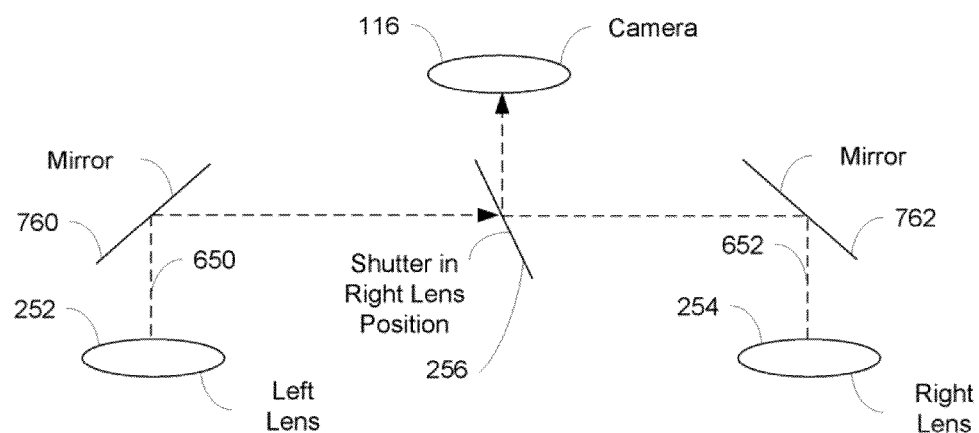
FIG. 8 illustrates another example configuration of an offset multiple lens system of a media enhancement dock in accordance with some embodiments.

In another embodiment, the multiple optical lenses 252, 254 may be physically offset from the camera 116, as shown in FIGS. 7 and 8 that illustrate further examples of multiple lens systems of media enhancement docks. The lens images produced by each of the optical lenses 252, 254 may be presented to the camera 116 indirectly. The optical lenses 252, 254 may be offset from the camera 116 so that the appropriate physical separation between the optical lenses 252, 254 is achieved to produce the necessary lens images for constructing a three dimensional image. In FIG. 7, the shutter 256 is in a left lens position so that a lens image 650 produced by the optical lens 252 is presented to the camera 116. The lens image 650 may be reflected by a mirror 760 and by the shutter 256 before reaching the camera 116. The lens image 652 produced by the optical lens 254 is blocked by the shutter 256 from reaching the camera 116 in FIG. 7. As shown in FIG. 8, the shutter 256 is in a right lens position so that the lens image 652 produced by the optical lens 254 is presented to the camera 116. The lens image 652 may be reflected by a mirror 762 and by the shutter 256 before reaching the camera 116. The lens image 650 produced by the optical lens 252 is blocked by the shutter 256 from reaching the camera 116 in FIG. 8. The shutter 256 may include a reflective pivoting shutter as described above with reference to FIGS. 5-8, but may also include other configurations that can multiplex the presentation of multiple lens images to the camera 116.

Returning to FIG. 2, multiple far-field microphones 262, 264 may be included in the dock 250. The array of microphones 262, 264 may sense and convert sound into respective audio signals. The microphones 262, 264 may be optimized to capture sound that originates from farther away from the electronic device 102 and the dock 250, such as in a family room or living room environment. For example, the microphones 262, 264 may have characteristics, such as gain and sensitivity, to clearly detect sound sourced from over ten feet away from the microphones 262, 264 and the dock 250. The microphones 262, 264 may be a condenser microphone, electret microphone, dynamic microphone, ribbon microphone, carbon microphone, piezoelectric microphone, fiber optic microphone, or other type of microphone. The directionality of each of the microphones 262, 264 may determine its sensitivity to sound, and can be omnidirectional, unidirectional, cardioid, supercardioid, shotgun, or other directionalities. One or more amplifiers may also be included in the microphones 262, 264 to increase their audio sensitivity.

The audio signals from the microphones 262, 264 may be transmitted to a processor 266 of the dock 250. The processor 266 may perform a beamforming analysis of the audio signals and produce a beamformed audio signal. A memory 268 may be in communication with the processor 266. Beamforming the audio signals may result in improved sensitivity to the sound detected in the environment and more accurate localization of sound. Techniques as known in the art may be used in the beamforming analysis, such as delay-and-sum. In some embodiments, the audio signal from one or both of the far-field microphones 262, 264 may be transmitted to the audio input interface 118 in lieu of a beamformed audio signal. If the audio signals from both of the far-field microphones 262, 264 are transmitted to the audio input interface 118, the processor 106 may perform the beamforming analysis. For example, the audio signals may be directly transmitted from the microphones 262, 264 to the audio input interface 118. As another example, the audio signals may be serialized by the processor 266 of the dock 250. The processor 266 may transmit the serialized audio signals to the audio input interface 118.

Figure 3:
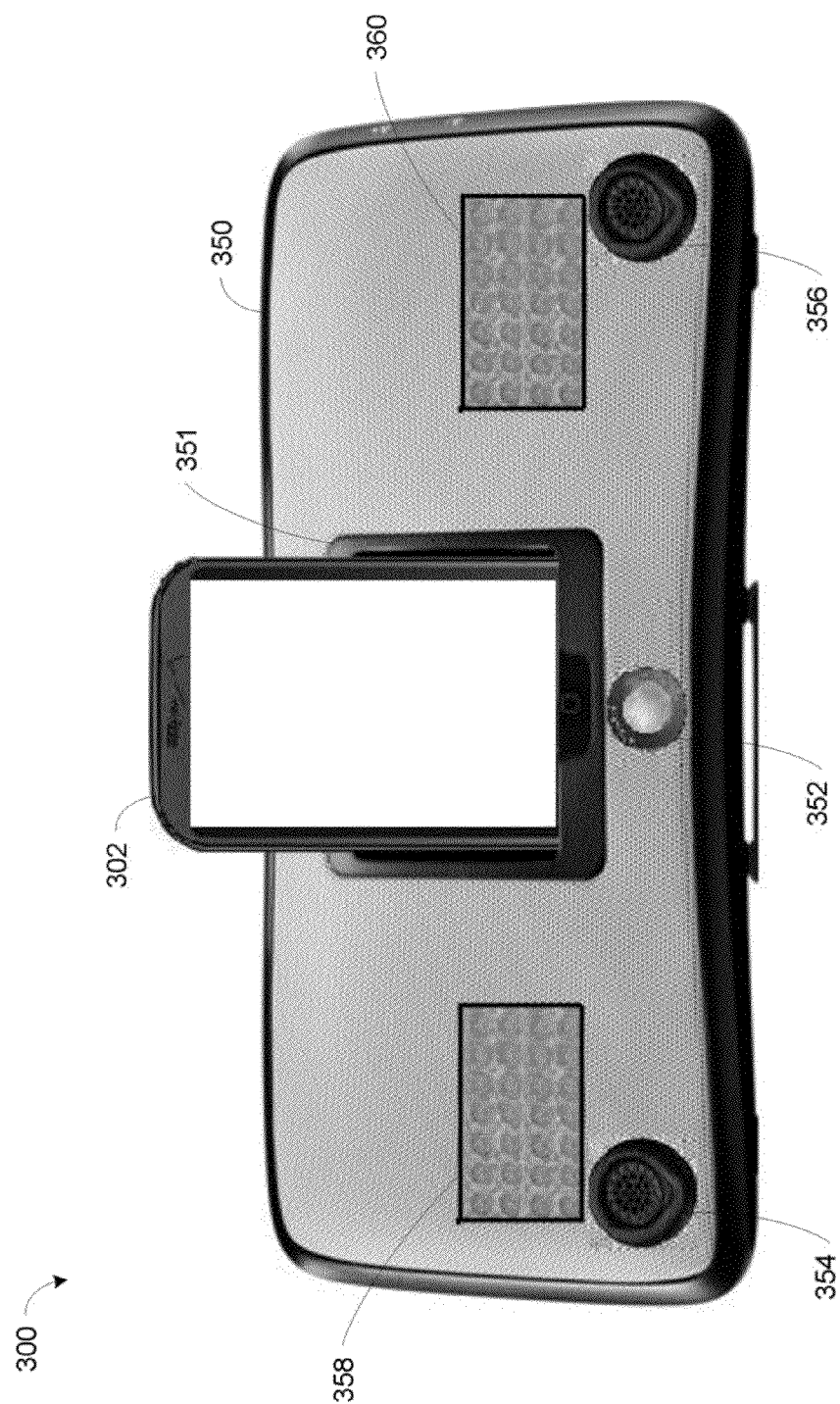
FIG. 3 illustrates an example of a media enhancement dock in accordance with some embodiments.
Figure 4:
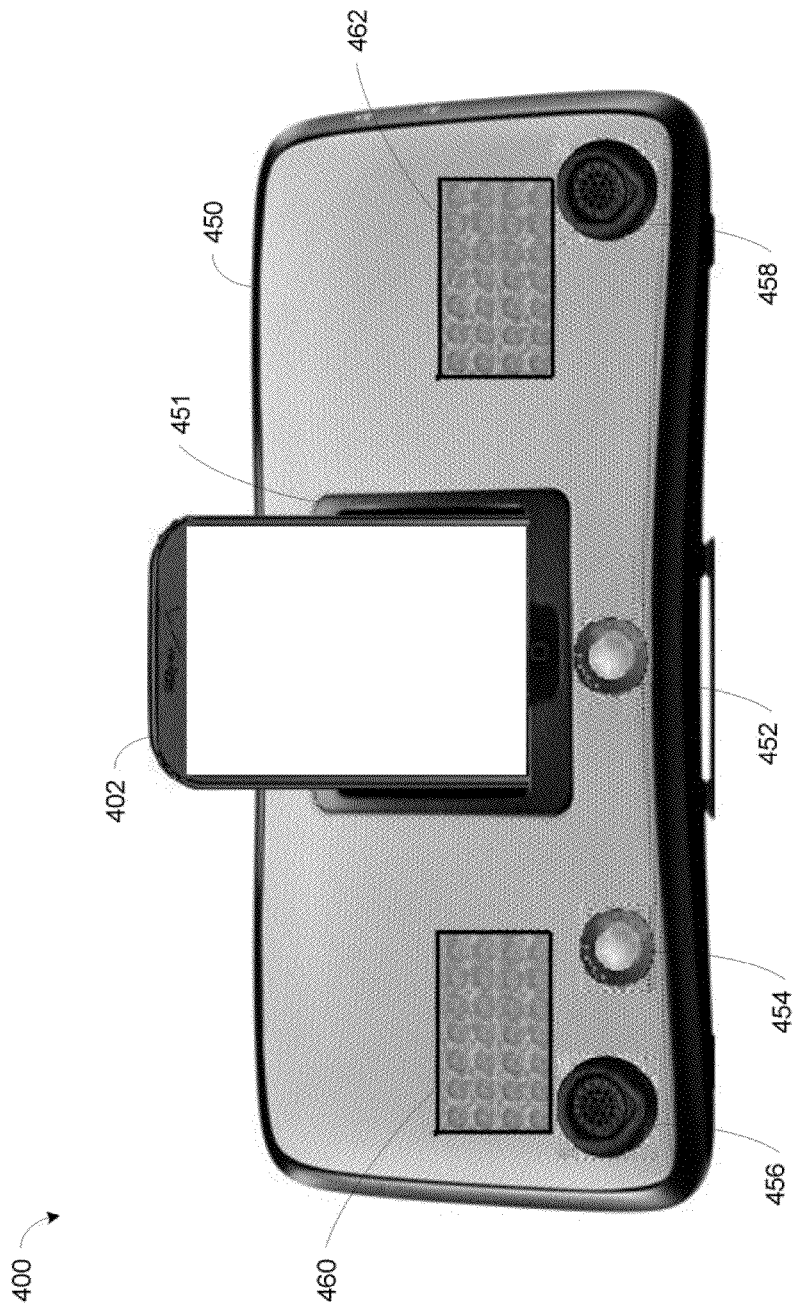
FIG. 4 illustrates another example of a media enhancement dock in accordance with some embodiments.

FIGS. 3 and 4 illustrate example media enhancement docks 300 and 400 consistent with some embodiments. It should be appreciated that the docks 300 and 400 are merely examples and can include various combinations of hardware and/or software components. As shown in FIGS. 3 and 4, the media enhancement dock 300, 400 may include a housing 350, 450 and a receptacle 351, 451 for receiving an electronic device 302, 402. The electronic device 302, 402 can be inserted into the receptacle 351, 451 such that the electronic device 302, 402 is physically and electrically interfaced with the dock 300, 400. In some embodiments, the physical configuration of the receptacle 351, 451 may promote physical and/or electrical connections between the data interface (not shown) of the electronic device 302, 402 and the data interface of the dock 300, 400.

Far-field microphones 354, 356 and 456, 458 may detect sound in the environment where the dock 300, 400 is located. As described above, a beamforming analysis may be performed by a processor of the electronic device 302, 402 on the separate audio signals from the microphones 354, 356 and 456, 458 to improve the detection of sound. The dock 300, 400 may also include lights 358, 360 and 460, 462 to illuminate the environment. The level of illumination of the lights 358, 360 and 460, 462 may be controlled based on a detected level of ambient light so that the lighting in the environment is sufficient for the camera to capture images and recognize gestures.

The dock 300 of FIG. 3 may include an optical lens 352 that is physically overlaid on a camera (not shown) of the electronic device 302. The lens image produced by the optical lens 352 may be directly or indirectly presented to the camera. The dock 400 of FIG. 4 may include optical lenses 452, 454 to allowing capturing and construction of three dimensional images. A shutter and shutter controller (e.g., as shown in FIGS. 2 and 5-8) may alternate the lens images from the optical lenses 452, 454 that are presented to the camera of the electronic device 402, as described above. An internal mirror may also be included in the dock 400 to reflect the lens image from the optical lens 454 to the shutter.

Figure 9:
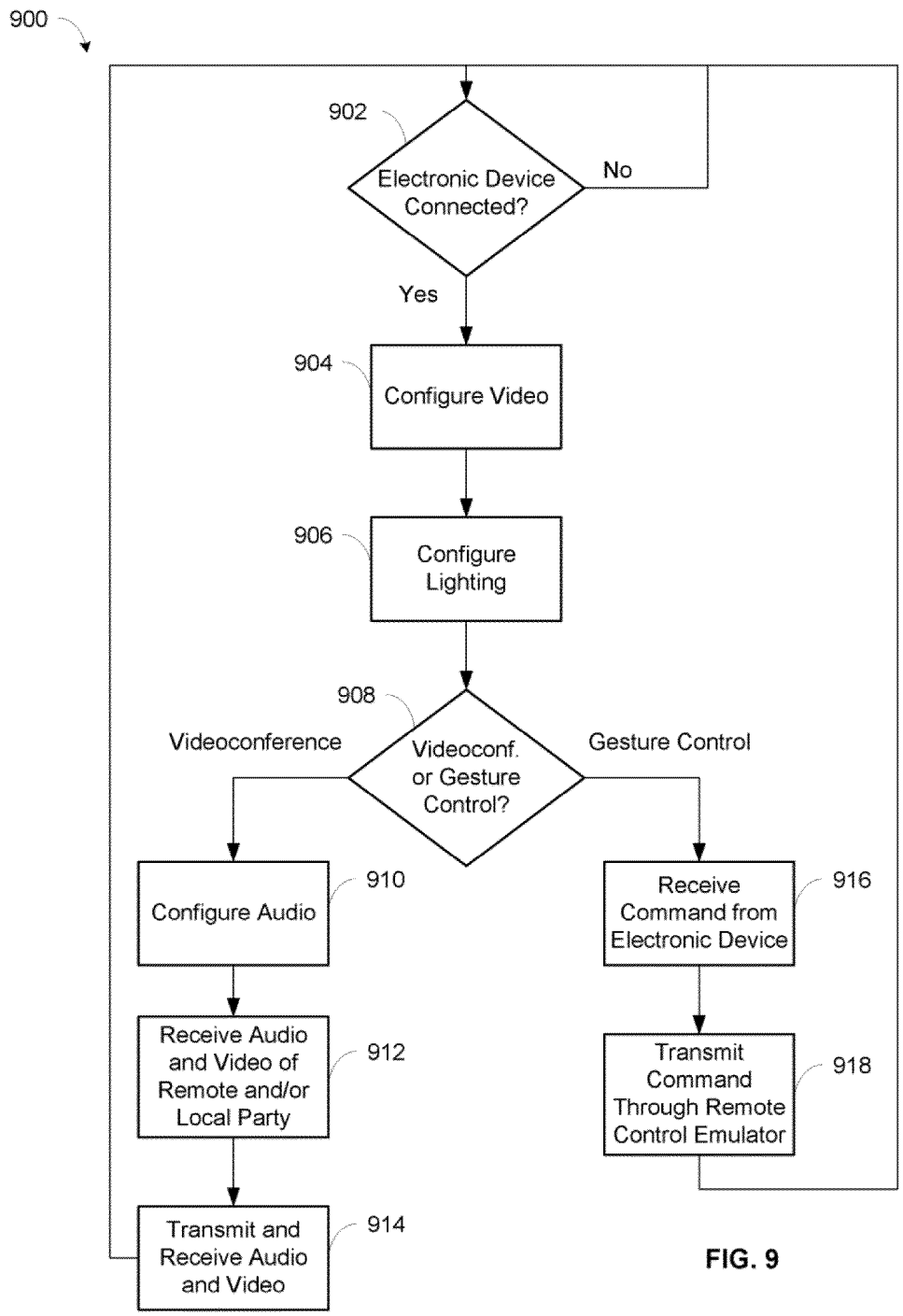
FIG. 9 is a flow diagram depicting videoconferencing and gesture control functions of a media enhancement dock in accordance with some embodiments.
Figure 10:
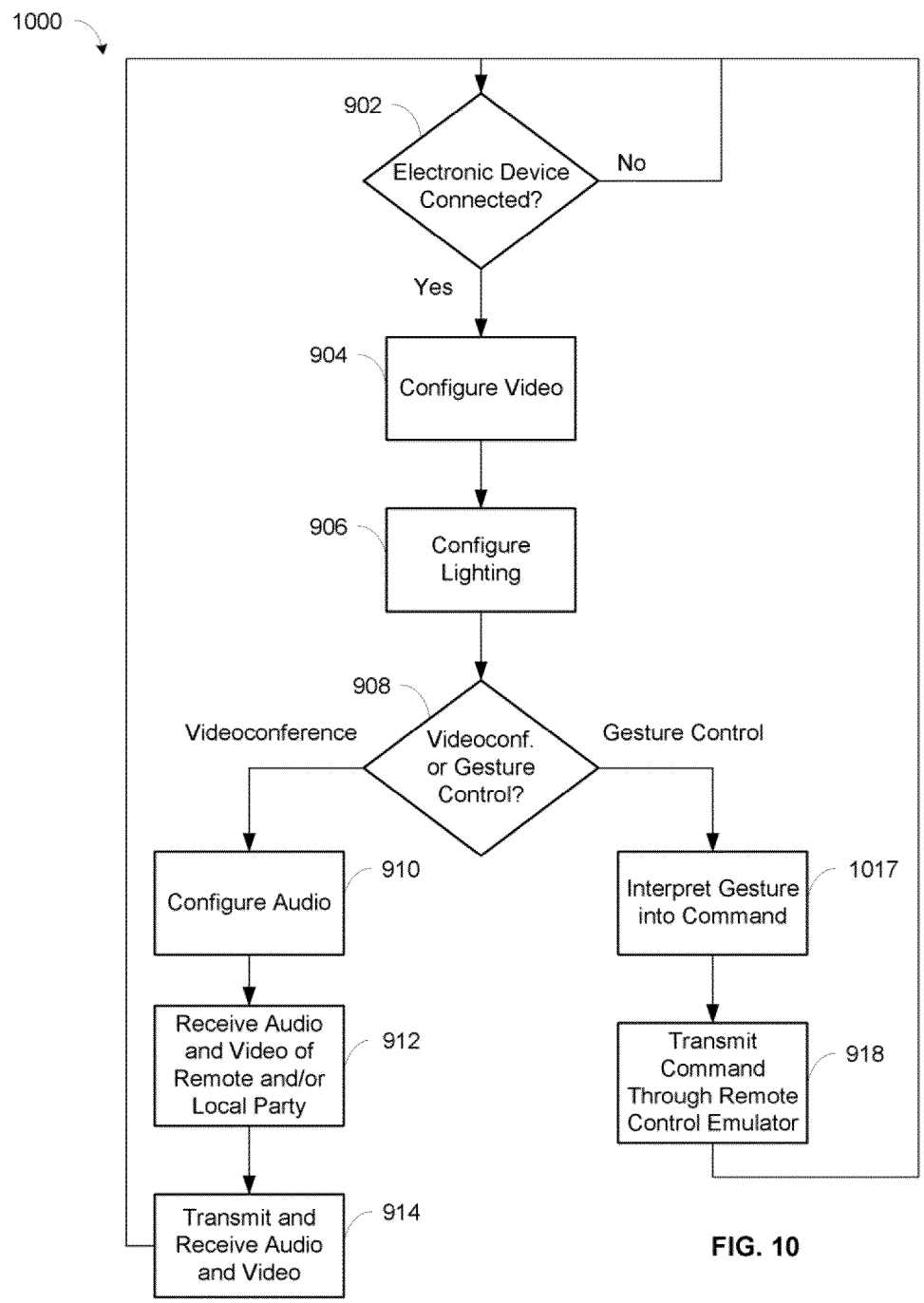
FIG. 10 is a flow diagram depicting videoconferencing and gesture control functions of a media enhancement dock in accordance with some embodiments.

FIGS. 9 and 10 are flowcharts of methods 900 and 1000 for performing videoconferencing and gesture control of a media enhancement dock in conjunction with an electronic device. The media enhancement dock may include the docks 150 and 250 and the electronic device may include the electronic device 102, as described above with reference to FIGS. 1 and 2. In general, a computer program product in accordance with an embodiment includes a computer usable storage medium (e.g., standard random access memory (RAM), an optical disc, a universal serial bus (USB) drive, or the like) having computer-readable program code embodied therein, wherein the computer-readable program code is adapted to be executed by the processor 106 (e.g., working in connection with an operating system) to implement the methods described below. In this regard, the program code may be implemented in any desired language, and may be implemented as machine code, assembly code, byte code, interpretable source code or the like (e.g., via C, C++, Java, Actionscript, Objective-C, Javascript, CSS, XML, and/or others).

Both methods 900 and 1000 begin with detecting 902 whether an electronic device is connected to the media enhancement dock. An electronic device may be detected as connected to the dock electrically, such as if the data interfaces of the electronic device and dock begin communication, or physically, such as if a button in the dock is depressed when the electronic device is inserted into the dock. If an electronic device is not connected to the dock, then the methods 900 and 1000 continue to detect 902 whether an electronic device is connected. However, if an electronic device is connected to the dock, then the methods 900 and 1000 configure 904 the video of the dock. Configuring the video may include determining if there are multiple optical lenses and whether three dimensional images are supported. The configuration of the video of the dock is described in more detail below with reference to FIG. 11.

After configuring the video, the lighting of the dock may be configured 906. Configuring the lighting may include detecting a level of ambient light in the environment where the dock is located and adjusting the level of illumination of a light source based on the detected level of ambient light. The configuration of the lighting of the dock is described in more detail below with reference to FIG. 12. The methods 900 and 1000 may determine 908 whether videoconferencing or gesture control is the desired application of the dock. Determining the desired application may be based on a selection of the user, such as by initiating the execution of a particular application on the electronic device or pressing a specified button on the dock. The screen of the electronic device may display instructions and/or query a user to select a desired application. The desired application may also be based on a predetermined default execution of a particular application upon connecting the electronic device to the dock.

If videoconferencing is the desired application, then the methods 900 and 1000 configure 910 the audio of the dock. Configuring the audio may include determining if there are multiple microphones and whether beamforming of audio signals should be performed. The configuration of the audio of the dock is described in more detail below with reference to FIG. 13. After the audio is configured, the dock may receive 912 the audio and/or video of a local and/or a remote party from the electronic device. The audio and/or video may be transmitted 914 by the dock to an external device, such as a television or set-top box, through a video output interface. Audio and/or video from the local party may also be received 914 by the dock and/or electronic device as part of a videoconference. In particular, the optical lens of the dock may produce lens images to be presented to the camera of the electronic device. In the case where multiple optical lenses are included in the dock, a shutter may alternately present lens images from the optical lenses to the camera. The far-field microphone(s) of the dock may produce an audio signal (or a beamformed audio signal in the case of multiple microphones) to be transmitted to the electronic device.

If gesture control is the desired application, then in the method 900 of FIG. 9, the dock receives 916 a command from the electronic device that is based on a gesture of a subject that is recognized and interpreted by the camera. A processor of the electronic device may interpret a gesture and determine the corresponding command. In the method 1000 of FIG. 10, if gesture control is the desired application, the dock interprets 1017 the gesture of a subject into the command. In particular, a processor of the dock may interpret the gesture and determine a corresponding command. For both methods 900 and 1000, the command may be transmitted 918 by the dock to a remote control emulator, such as an infrared blaster, to a consumer electronics device that may perform an action in accordance with the command. The methods 900 and 1000 may return to detecting 902 whether an electronic device is connected to the media enhancement dock following transmitting and receiving 914 audio and video and transmitting 918 a command to a remote control emulator. In this way, the dock may execute videoconferencing and/or gesture control applications, as desired.

Figure 11:
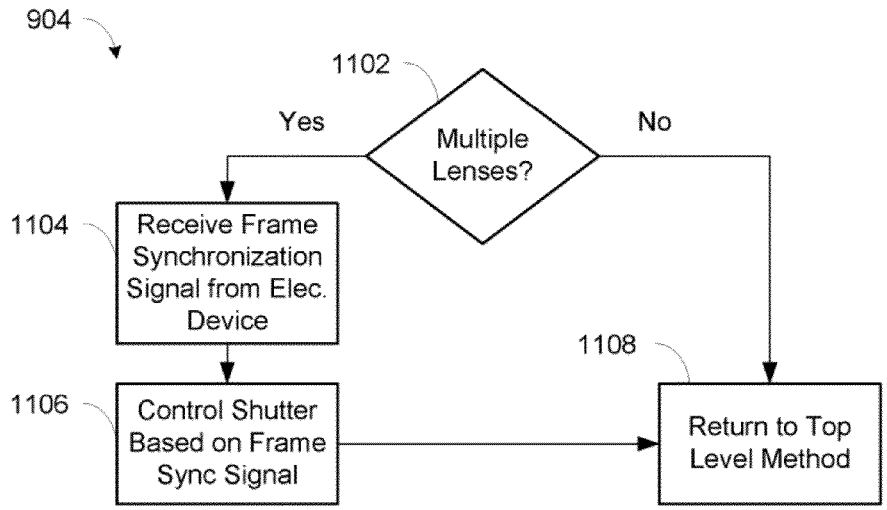
FIG. 11 is a flow diagram depicting the video configuration of a media enhancement dock in accordance with some embodiments.

FIG. 11 is a flowchart of a method 904 that corresponds to configuring 904 the video of the dock in the methods 900 and 1000 of FIGS. 9 and 10. The method 904 may determine 1102 whether multiple optical lenses are present in the dock. If multiple optical lenses are present, then three dimensional images may be constructed by a processor based on the multiple lens images from each of the optical lenses. The dock may receive 1104 a frame synchronization signal from the electronic device through a data interface. The frame synchronization signal may allow a shutter of the dock to be controlled 1106 with the appropriate timing that corresponds to the frame rate of the camera of the electronic device. The method 904 may return 1108 to the top level methods 900 and 1000. However, if multiple optical lenses are not present in the dock, then the method 904 may also return 1108 to the top level methods 900 and 1000. Regardless of whether there is a single optical lens or multiple optical lenses in the dock, the optical lens may allow far-field images to be captured by a camera of the electronic device. The optical lens may allow images including objects that are over ten feet away from the optical lens to be captured by the camera.

Figure 12:
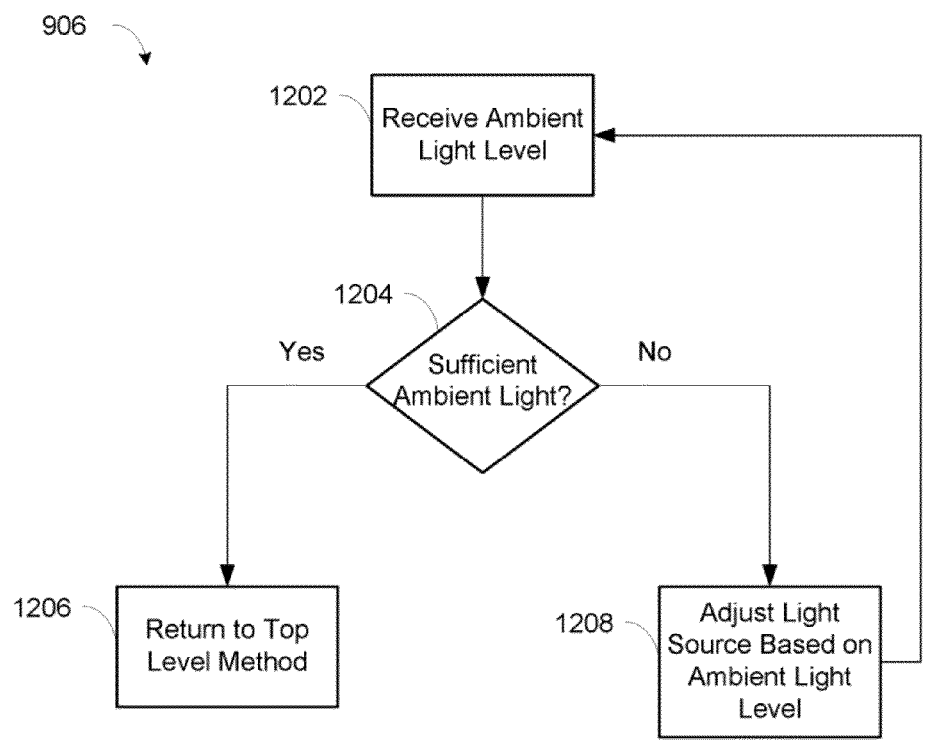
FIG. 12 is a flow diagram depicting the lighting configuration of a media enhancement dock in accordance with some embodiments.

FIG. 12 is a flowchart of a method 906 that corresponds to configuring 906 the lighting using the dock in the methods 900 and 1000 of FIGS. 9 and 10. The method 906 may begin with receiving 1202 an ambient light level of the environment where the dock and the electronic device are located. The ambient light level may be detected by a light sensor of the dock, the electronic device, and/or a lighting control system. It may be determined 1204 that there is a sufficient level of ambient light. A sufficient level of ambient light may include whether subjects in the field of view of the camera can be viewed, such as whether images farther away from the camera can be captured and/or gestures can be recognized and interpreted. Predetermined or dynamic thresholds of levels of ambient light may determine whether there is a sufficient level of ambient light. If there is a sufficient level of ambient light, then the method 906 may return 1206 to the top level methods 900 and 1000.

However, if there is not a sufficient level of ambient light, then a lighting controller of the dock may adjust 1208 a level of illumination of a light source, based on the detected level of ambient light. The level of illumination of the light source may be increased or decreased, depending on the detected level of ambient light. The light source may include a light on the dock, a flash or light on the electronic device, and/or a light source external to the dock and the electronic device that is controlled by a lighting control system. A lighting control system, such as those following the ZigBee, Z-Wave, X10, or similar protocols, may be in wired or wireless communication with the lighting controller. The lighting controller may therefore communicate adjustments to the level of illumination of these external light sources through the lighting control system. The level of illumination of any combination of the light sources may be adjusted by the lighting controller. After adjusting the level of illumination of the light source, the method 906 may return to receive 1202 the ambient light level of the environment to ensure a sufficient ambient light level has been attained. It should be noted that it is possible that a light source may not be turned on if the detected level of ambient light is already sufficient.

Figure 13:
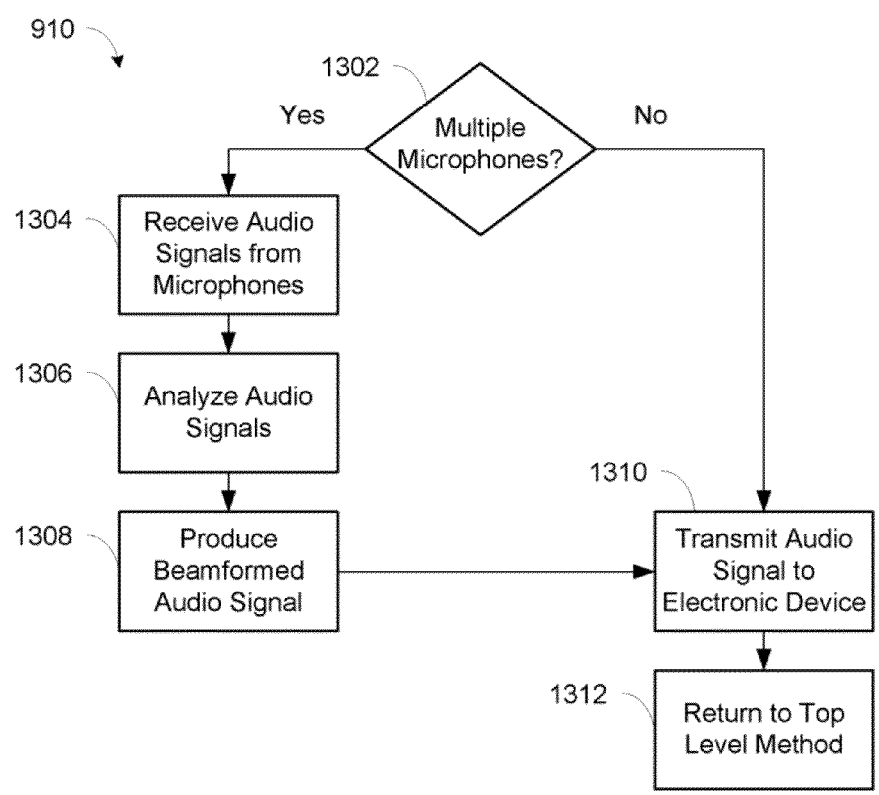
FIG. 13 is a flow diagram depicting the audio configuration of a media enhancement dock in accordance with some embodiments.

FIG. 13 is a flowchart of a method 910 that corresponds to configuring 910 the audio of the dock in the methods 900 and 1000 of FIGS. 9 and 10. The method 910 may begin with determining 1302 whether multiple far-field microphones are present in the dock. If multiple microphones are present, then the multiple audio signals from the microphones may be beamformed by a processor to achieve greater sensitivity and localization of the sound in the environment where the dock and electronic device are located. A processor of the dock may receive 1304 the audio signals from the multiple far-field microphones. The audio signals may be analyzed 1306 by the processor to produce 1308 a beamformed audio signal. The beamformed audio signal may be transmitted 1310 to an audio input of the electronic device. The method 910 may return 1312 to the top level methods 900 and 1000. However, if multiple microphones are not present in the dock, then the audio signal from the single far-field microphone may be transmitted 1310 to the audio input of the electronic device. The method 910 may then return 1312 to the top level methods 900 and 1000. Regardless of whether is a single microphone or multiple microphones in the dock, the microphone may have characteristics, such as gain and sensitivity, to clearly detect sound sourced from over ten feet away from the microphone.

Thus, it should be clear from the preceding disclosure that a system and method of a media enhancement dock may augment and enhance the video and audio capabilities of an electronic device. The system and method advantageously enhances the field of view of a camera of the electronic device to view far-field images and/or capture and construct three dimensional images. Further, the system and method advantageously enhances the sound captured by including far-field microphones and/or beamforming capabilities.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A media enhancement dock, comprising:
   a housing configured to interface with an electronic device having a camera and an audio input interface, the housing defining a receptacle configured to receive a portion of the electronic device having the camera;
   a first optical lens, disposed on the housing, for producing a first lens image and configured to enhance a field of view of the camera, the first optical lens overlapping with the camera of the electronic device when the electronic device is inserted into the receptacle of the housing, wherein the first lens image is presented to the camera;
   a first far-field microphone for sensing and converting sound into a first audio signal and configured to communicate the first audio signal to the audio input interface;
   a second optical lens, disposed on the housing, for producing a second lens image and configured to enhance the field of view of the camera, the second optical lens being disposed a distance from the first optical lens;
   a shutter configured to present the first lens image to the camera when in a first position and to present the second lens image to the camera when in a second position; and
   a shutter controller configured to adjust whether the shutter is in the first position or the second position, based on a frame synchronization signal received from the electronic device.

2. The dock of claim 1, further comprising:
   a second microphone for sensing and converting the sound into a second audio signal; and
   a processor in communication with the first far-field microphone, the second microphone, and the audio input interface, the processor configured to perform operations comprising:
   receiving the first audio signal and the second audio signal;
   performing a beamforming analysis of the first audio signal and the second audio signal to produce a beamformed audio signal; and
   transmitting the beamformed audio signal to the audio input interface.

3. The dock of claim 2, wherein the second microphone comprises one or more of:
   a second far-field microphone of the dock for sensing and converting the sound into the second audio signal; or
   an internal microphone of the electronic device for sensing and converting the sound into the second audio signal.

4. The dock of claim 1, wherein the first optical lens comprises one or more of:
   a wide angle lens;
   a fisheye lens; or
   a high power zoom lens.

5. The dock of claim 4, further comprising:
   a processor in communication with the high power zoom lens, the processor configured to perform operations comprising:
   receiving a zoom command from the electronic device; and
   controlling the high power zoom lens, based on the zoom command.

6. The dock of claim 1, wherein the frame synchronization signal is received from the electronic device via a data interface between the electronic device and the dock.

7. The dock of claim 1, further comprising:
   a lighting controller for controlling a level of illumination of a light source, based on a level of ambient lighting.

8. The dock of claim 7, wherein the light source comprises one or more of:
   an integrated light source of the dock;
   a light source of the electronic device; or
   a light source external to the dock and external to the electronic device that is in communication with the dock through a lighting control system.

9. The dock of claim 1, further comprising:
   a video input interface configured to receive a video signal from the electronic device, wherein the video signal comprises one or more of video of a remote party or video of a local party; and
   a video output interface configured to transmit the video signal to a display.

10. The dock of claim 1, further comprising:
    a data input interface configured to receive a data signal from the electronic device, wherein the data signal comprises a control command that is based on the first lens image.

11. A media enhancement dock, comprising:
    a housing configured to interface with an electronic device having a camera and a data output interface, the housing defining a receptacle configured to receive a portion of the electronic device having the camera;
    a first optical lens, disposed on the housing, for producing a first lens image and configured to enhance a field of view of the camera, the first optical lens overlapping with the camera of the electronic device when the electronic device is inserted into the receptacle of the housing, wherein the first lens image is presented to the camera;
    a second optical lens, disposed on the housing a distance from the first optical lens, for producing a second lens image and configured to enhance the field of view of the camera;
    a shutter configured to present the first lens image and the second lens image to the camera, wherein the second lens image is reflected to the shutter by an optical waveguide, the shutter being configured to present the first lens image to the camera when in a first position and to present the second lens image to the camera when in a second position;
    a data input interface configured to receive a data signal from the data output interface, wherein the data signal comprises a control command that is based on the first lens image; and a shutter controller configured to adjust whether the shutter is in the first position or the second position based on a frame synchronization signal received from the electronic device.

12. The dock of claim 11, wherein the first optical lens comprises one or more of:
a wide angle lens;
a fisheye lens; or
a high power zoom lens.

13. The dock of claim 12, further comprising:
a processor in communication with the high power zoom lens, the processor configured to perform operations comprising:
receiving a zoom command from the electronic device; and
controlling the high power zoom lens, based on the zoom command.

14. The dock of claim 11, wherein the frame synchronization signal is received by the data input interface from the data output interface of the electronic device.

15. The dock of claim 11, wherein the control command is based on a three-dimensional image that is based on the first lens image and the second lens image.

16. The dock of claim 11, further comprising:
a remote control emulation device configured to transmit the control command to an external device.

17. The dock of claim 11, further comprising:
a lighting controller for controlling a level of illumination of a light source, based on a level of ambient lighting.

18. The dock of claim 17, wherein the light source comprises one or more of:
an integrated light source of the dock;
a light source of the electronic device; or
a light source external to the dock and external to the electronic device that is in communication with the dock through a lighting control system.

19. The dock of claim 11, further comprising:
a video input interface configured to receive a video signal from the electronic device, wherein the video signal comprises one or more of video of a remote party or video of a local party; and
a video output interface configured to transmit the video signal to a display.

20. The dock of claim 11, further comprising:
a first far-field microphone for sensing and converting sound into a first audio signal and configured to communicate the first audio signal to an audio input interface of the electronic device.

21. The dock of claim 20, further comprising:
a second microphone for sensing and converting the sound into a second audio signal; and
a processor in communication with the first far-field microphone, the second microphone, and the audio input interface, the processor configured to perform operations comprising:
receiving the first audio signal and the second audio signal;
performing a beamforming analysis of the first audio signal and the second audio signal to produce a beamformed audio signal; and
transmitting the beamformed audio signal to the audio input interface.

* * * * *